(12) United States Patent
Leach et al.

(10) Patent No.: US 10,855,475 B1
(45) Date of Patent: Dec. 1, 2020

(54) SYSTEMS AND METHODS FOR SECURING DATA TO AN IMMUTABLE DISTRIBUTED LEDGER

(71) Applicant: Facebook, Inc., Menlo Park, CA (US)

(72) Inventors: Frederick R. Leach, Portola Valley, CA (US); Michael Randolph Corey, New York, NY (US); Erik Taubeneck, Brooklyn, NY (US); Daniel K. Chapsky, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 176 days.

(21) Appl. No.: 16/123,480

(22) Filed: Sep. 6, 2018

(51) Int. Cl.
*H04L 9/32* (2006.01)
*G06F 21/62* (2013.01)
*H04L 29/06* (2006.01)
*H04L 9/06* (2006.01)
*H04L 29/08* (2006.01)

(52) U.S. Cl.
CPC ............ *H04L 9/3247* (2013.01); *G06F 21/62* (2013.01); *H04L 9/0637* (2013.01); *H04L 63/10* (2013.01); *H04L 63/12* (2013.01); *H04L 67/10* (2013.01); *H04L 2209/38* (2013.01)

(58) Field of Classification Search
CPC ..... H04L 9/3247; H04L 9/0637; H04L 63/12; H04L 63/10; H04L 67/10; H04L 2209/38; G06F 21/62
See application file for complete search history.

(56) References Cited

U.S. PATENT DOCUMENTS

| | | | |
|---|---|---|---|
| 2017/0279774 A1* | 9/2017 | Booz | G06Q 20/123 |
| 2018/0005186 A1* | 1/2018 | Hunn | G06F 40/103 |
| 2018/0247376 A1* | 8/2018 | Sharma | G06Q 20/102 |
| 2019/0158275 A1* | 5/2019 | Beck | G06Q 20/3829 |
| 2019/0205563 A1* | 7/2019 | Gonzales, Jr. | G06F 21/62 |
| 2020/0027067 A1* | 1/2020 | Hertzog | G06Q 20/389 |

* cited by examiner

*Primary Examiner* — Michael R Vaughan (74) *Attorney, Agent, or Firm* — FisherBroyles, LLP (57) ABSTRACT

The disclosed computer-implemented method for securing data on blockchains may include receiving a smart contract from a third-party for a designated party and a data set, transmitting, to a network of nodes, a request to add the smart contract and the data set to an immutable distributed ledger, receiving a digital signature from the third-party, receiving a digital signature from the designated party, validating the smart contract, the digital signature from the third-party, and the digital signature from the designated party, and in response to validating the smart contract, the digital signature from the third-party and the digital signature from the designated party, adding the smart contract and the data set to the immutable distributed ledger. Various other methods, systems, and computer-readable media are also disclosed.

20 Claims, 8 Drawing Sheets

SYSTEMS AND METHODS FOR SECURING DATA TO AN IMMUTABLE DISTRIBUTED LEDGER

BACKGROUND

The dissemination of information through different computing systems can be rapid and widespread. Unfortunately, conventional systems are not able to ensure that the data being propagated through such systems was collected properly or used correctly. For example, data may be collected for one purpose, but if the data is shared without the proper permissions and then misused by a different party, conventional systems may not provide a computationally verifiable mechanism to prove the provenance of the data being used. This may have particularly harmful implications for confidential data, personally identifiable information, or other such sensitive information. Once data has been passed among and used by different parties, it may be difficult to determine the origin of the data and corresponding permissions for use of the data.

SUMMARY

As will be described in greater detail below, the instant disclosure describes securing data to immutable distributed ledgers, such as those implemented using blockchain methodologies.

In one example, a computer-implemented method may include (i) receiving, by a computing device, a smart contract from a third-party for a designated party and a data set, (ii) transmitting, to a network of nodes, a request to add the smart contract and the data set to an immutable distributed ledger, (iii) receiving a digital signature from the third-party, (iv) receiving a digital signature from the designated party, (v) validating the smart contract, the digital signature from the third-party, and the digital signature from the designated party, and (vi) in response to validating the smart contract, the digital signature from the third-party and the digital signature from the designated party, adding the smart contract and the data set to the immutable distributed ledger.

In some examples, the digital signature from the third-party may be an attestation that the data set is legal and ethical and the digital signature from the designated party may be an attestation that the data set is legal and ethical. The data set may include personally identifying information and the method may further include (i) obtaining a public key of the third-party, (ii) obtaining a public key of the designated party, and (iii) encrypting the data set with the public key of the third-party and the public key of the designated party. A public key of a party granted access to the data set may be obtained and the data set may be encrypted with the public key of the party granted access to the data set. In some examples, the smart contract may include a hash of external data used to build the data set.

In some examples, the computing device may receive a digital signature from a regulator as an attester of the smart contract and validate the smart contract, the digital signature from the third-party, the digital signature from the designated party, and the digital signature from the regulator. In some examples, validating the smart contract may include obtaining information from an external data source and verifying the data set using the information from the external data source. In some examples, adding the smart contract and the data set to the immutable distributed ledger may include executing the smart contract and logging the data set to the immutable distributed ledger. In some examples, adding the smart contract and the data set may include (i) obtaining a prior record in the immutable distributed ledger, (ii) generating a hash of the prior record, (iii) generating a new record comprising the hash of the prior record and the data set, and (iv) adding the new record to the immutable distributed ledger. In some embodiments, the method may include (i) receiving a different smart contract from the third-party for a different designated party and a subset of the data set, (ii) transmitting, to the network of nodes, a different request to add the different smart contract and the subset of the data set to the immutable distributed ledger, (iii) receiving a new digital signature from the third-party, (iv) receiving a digital signature from the different designated party, (v) validating the smart contract, the new digital signature from the third-party, and the digital signature from the different designated party, and (vi) adding the smart contract and the subset of the data set to the immutable distributed ledger.

In addition, a corresponding system may include a computing device that includes at least one physical processor and physical memory comprising computer-executable instructions that, when executed by the at least one physical processor, may cause the computing device to (i) receive a smart contract from a third-party for a designated party and a data set, (ii) transmit, to a network of nodes, a request to add the smart contract and the data set to an immutable distributed ledger, (iii) receive a digital signature from the third-party, (iv) receive a digital signature from the designated party, (v) validate the smart contract, the digital signature from the third-party, and the digital signature from the designated party, and (vi) in response to validating the smart contract, the digital signature from the third-party and the digital signature from the designated party, add the smart contract and the data set to the immutable distributed ledger.

In some examples, the above-described method may be encoded as computer-readable instructions on a computer-readable medium. For example, a computer-readable medium may include one or more computer-executable instructions that, when executed by at least one processor of a computing device, may cause the computing device to (i) receive a smart contract from a third-party for a designated party and a data set, (ii) transmit, to a network of nodes, a request to add the smart contract and the data set to an immutable distributed ledger, (iii) receive a digital signature from the third-party, (iv) receive a digital signature from the designated party, (v) validate the smart contract, the digital signature from the third-party, and the digital signature from the designated party, and (vi) in response to validating the smart contract, the digital signature from the third-party and the digital signature from the designated party, add the smart contract and the data set to the immutable distributed ledger.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to securing data to an immutable distributed ledger, such as one implemented using a blockchain methodology. The systems and methods described herein are directed to immutably logging data to the immutable distributed ledger to enforce transparency. In one example, sensitive data, such as personally identifying information, may be uploaded to a blockchain. The blockchain may log all instances of use of the data, statements indicating that entities and individuals are using the data in legal and ethical ways, and statements indicating that the data was obtained legally and ethical. Thus, the provenance of the data uploaded to the system may be generated and maintained.

In some examples, a third-party may collect information and store the information in a data set. A third-party may be an individual or entity that collects data. Examples of a third-party that may collect information may include, but are not limited to, social media providers, advertisers, agencies (e.g., marketing agencies, public relation agencies, branding agencies, etc.), and/or vendors. The data collected may be information collected through a direct relationship with a person or entity. For example, the third-party may collect information from customers and or users of their services. Examples of information that may be collected through the direct relationship between the third-party and the users may include contact information (e.g., email addresses, phone number, addresses, etc.), social media interactions, purchase histories and behaviors while interaction with an application or website or the like. In one example, a third-party may build a data set, such as a target audience or custom audience data set. The data set may include the information collected from users or entities (e.g., personally identifying information).

The third-party may request to upload data sets that include information collected from a group of users to the immutable distributed ledger (e.g., blockchain). In some examples, the immutable distributed ledger may be an electronic ledger that may be publicly shared among users. The ledger may include an unchangeable record of transactions, where each record includes a timestamp and a link to a previous record. In some examples, immutable distributed ledgers may be implemented using a blockchain methodology. The terms "immutable distributed ledger" and "blockchain" may be used interchangeably throughout the descriptions herein.

Blockchains may provide an immutable distributed ledger with write access controlled by a consensus mechanism. Smart contracts may be stored in a block of the blockchain. Smart contracts may be auto-executing rules that execute on the immutable distributed ledger once certain preconditions are met. In some examples, the smart contract may be stored in a record or block of the immutable distributed ledger and may include rules for the terms of an agreement, rules for verifying fulfillment of the terms, and rules for executing the agreed terms. In a smart contract approach, an asset or currency is transferred into a program and the program executes the code of the smart contract. The program may then automatically validate a condition of the smart contract and automatically determine whether an action should be taken in accordance with the terms of the smart contract. For example, an asset or currency (e.g., targeting data logged to the blockchain) may be transferred to a designated party of the smart contract. In some examples, a party of the smart contract may be notified that the conditions of the smart contract were not fulfilled and that the transaction may be terminated. In some examples, smart contracts may require the digital signing of the contract, the providing of properly vetted data, and the inclusion of the correct logging protocol. A consensus protocol may be used to ensure that all steps of the process are valid, which may include communicating with outside data sources to confirm and validate data and the like. The consensus protocol may provide proof that the transactions are valid and correct by anonymous checking from a series of third parties.

The third-party may digitally sign the smart contract, attesting that the data set was obtained legally and ethically. The smart contract may be signed using a digital signature. Digital signatures may be a type of electronic signature that encrypts public information or data with a digital code that is difficult to duplicate but easy to verify. In some examples, a digital signature may be used for presenting the authenticity of a digital message or transaction. A digital signature may provide the recipient assurance that the message or transaction is created by a known sender, that the sender cannot deny having sent the message, and that the message was not altered during transmission. The other party of the smart contract, such as a publisher, may review the data set and smart contract and digitally sign the smart contract. In some examples, a regulator entity may sign as an attester or observer of the process (e.g., smart contract). In some examples, the publisher may be an entity that distributes electronic content, such as through websites, emails, social media platforms, or the like. Examples of publishers may include social media providers, content providers, online retailers, and the like. Publishers may use the data collected by the third-party (e.g., advertisers, agencies, vendors, etc.) and obtained from the immutable distributed ledger to target a custom audience that meets one or more requirements (e.g., demographics, purchasing behavior, etc.). The regulator may be an entity that is a party to the smart contract to ensure that an objective party is witness to the terms of the smart contract.

The systems described herein may execute the smart contract and log the data set to the blockchain upon validation of the digital signatures and attestations of the data set. In some examples, the data set may be encrypted with public keys of parties who may access the data. The data may include copies and/or hashes of any external data used to build the data set, including provenance. The data and personally identifying information may ultimately reference one or more other sets of data already stored in a blockchain. Thus, the systems and methods provided herein may provide an immutable ledger of the transactions stored in the blockchain with details secured cryptographically to all parties that are authorized to access the information (e.g., third-party, publisher, regulator, and the like).

Figure 1:
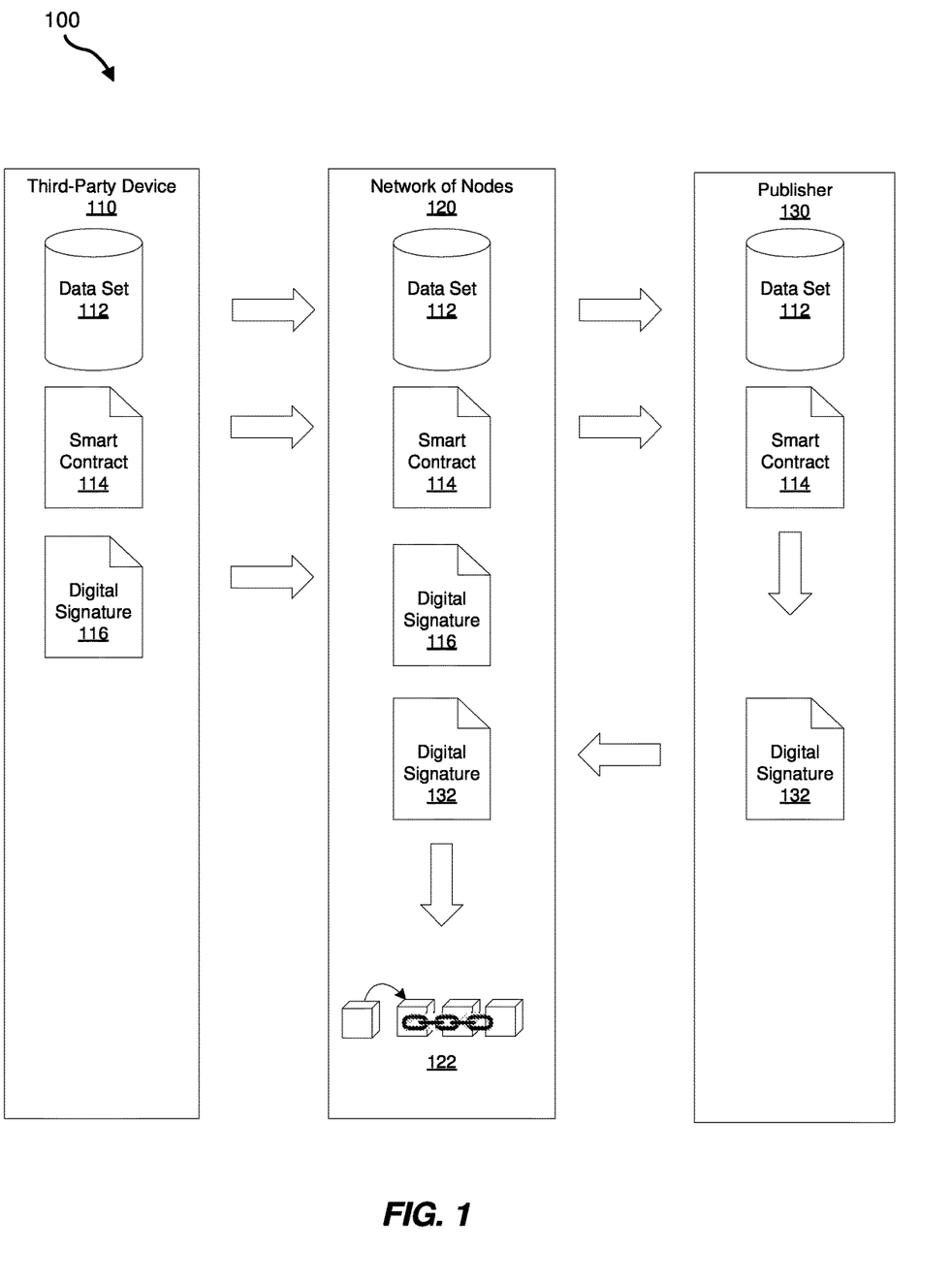
FIG. 1 is a block diagram of an exemplary environment for securing data to an immutable distributed ledger in accordance with one or more embodiments of the disclosure.
Figure 2:
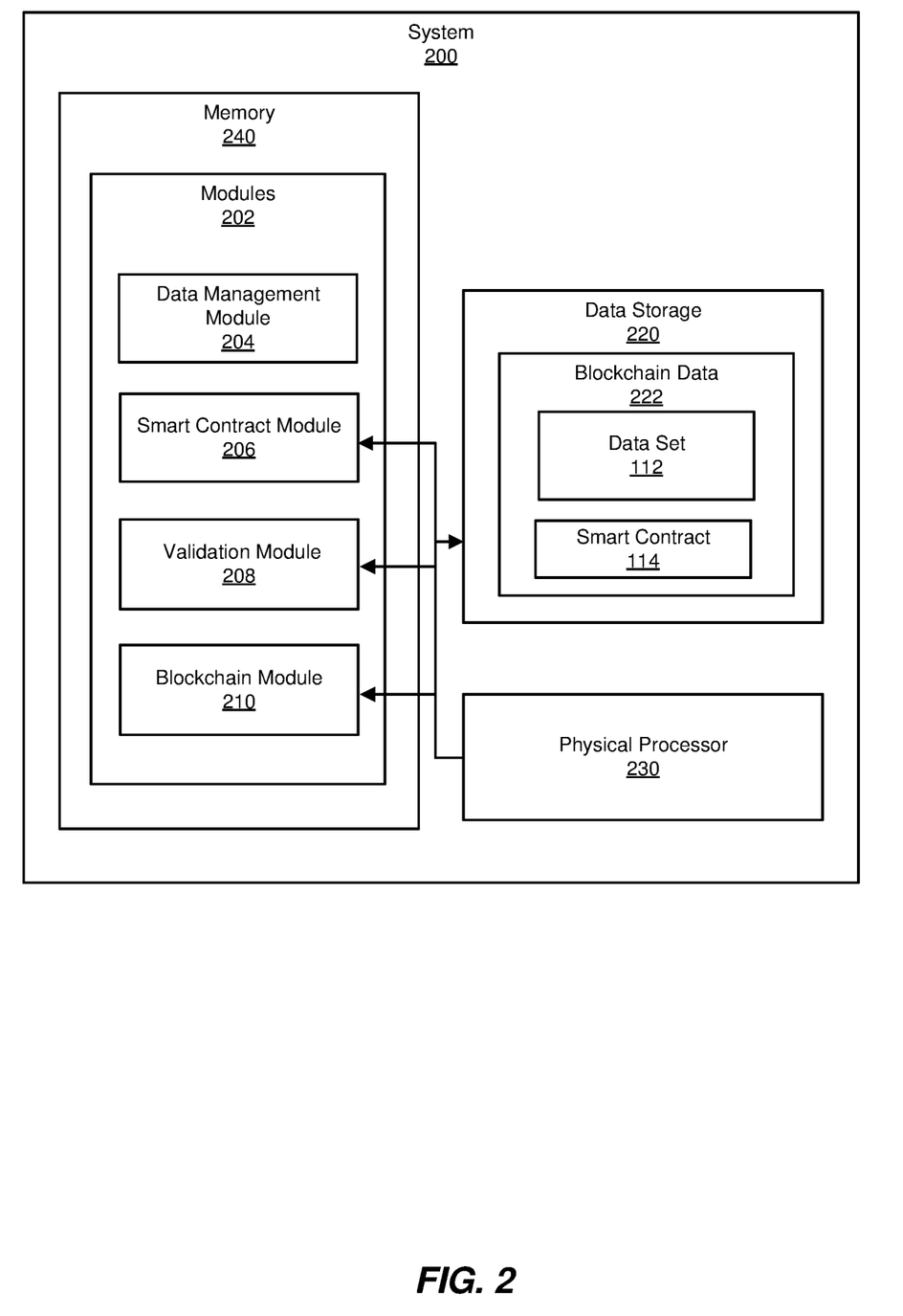
FIG. 2 is a block diagram of an example system for securing data to an immutable distributed ledger in accordance with one or more embodiments of the disclosure.
Figure 3:
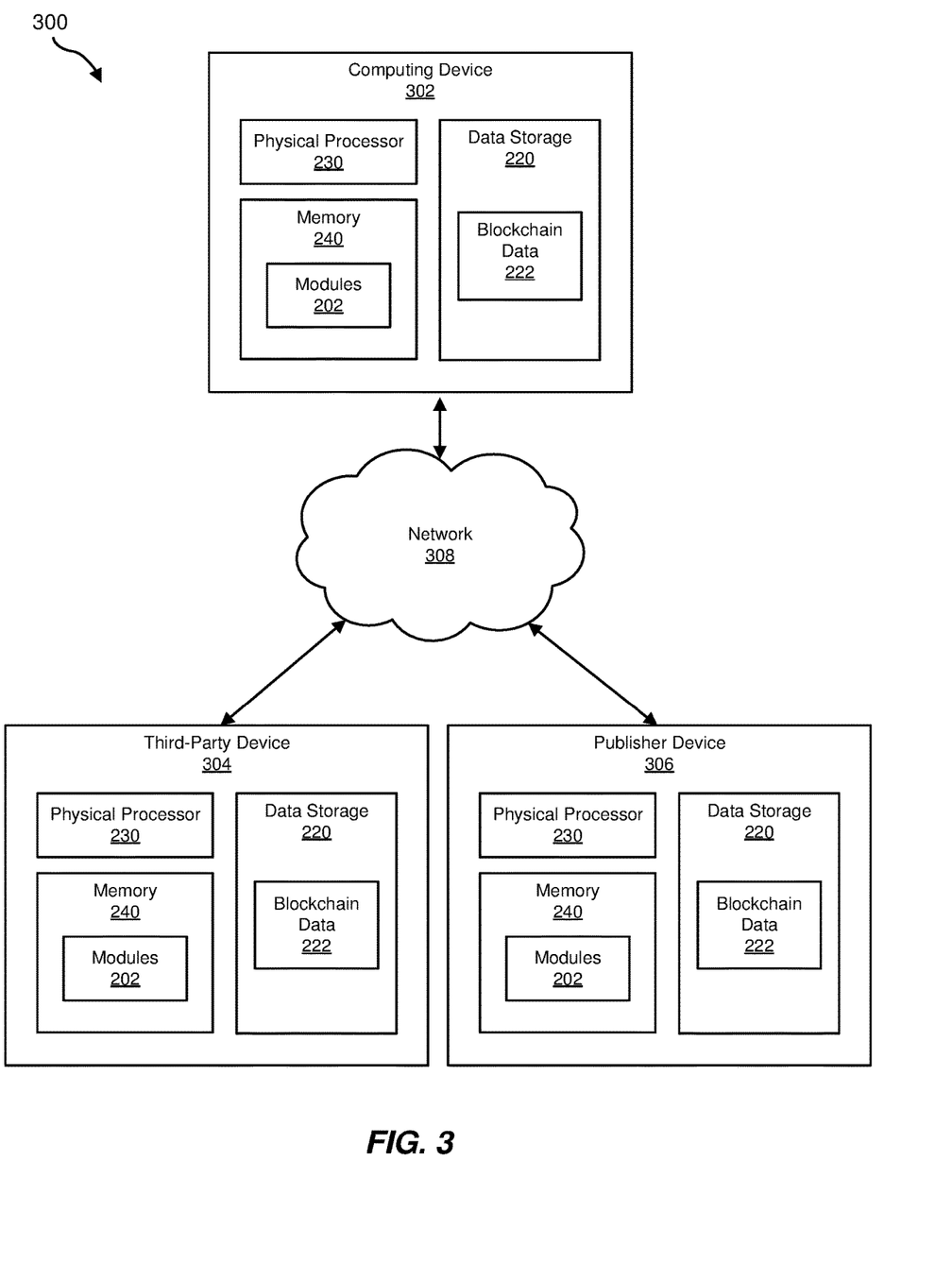
FIG. 3 is a block diagram of an additional example system for securing data to an immutable distributed ledger in accordance with one or more embodiments of the disclosure.
Figure 4:
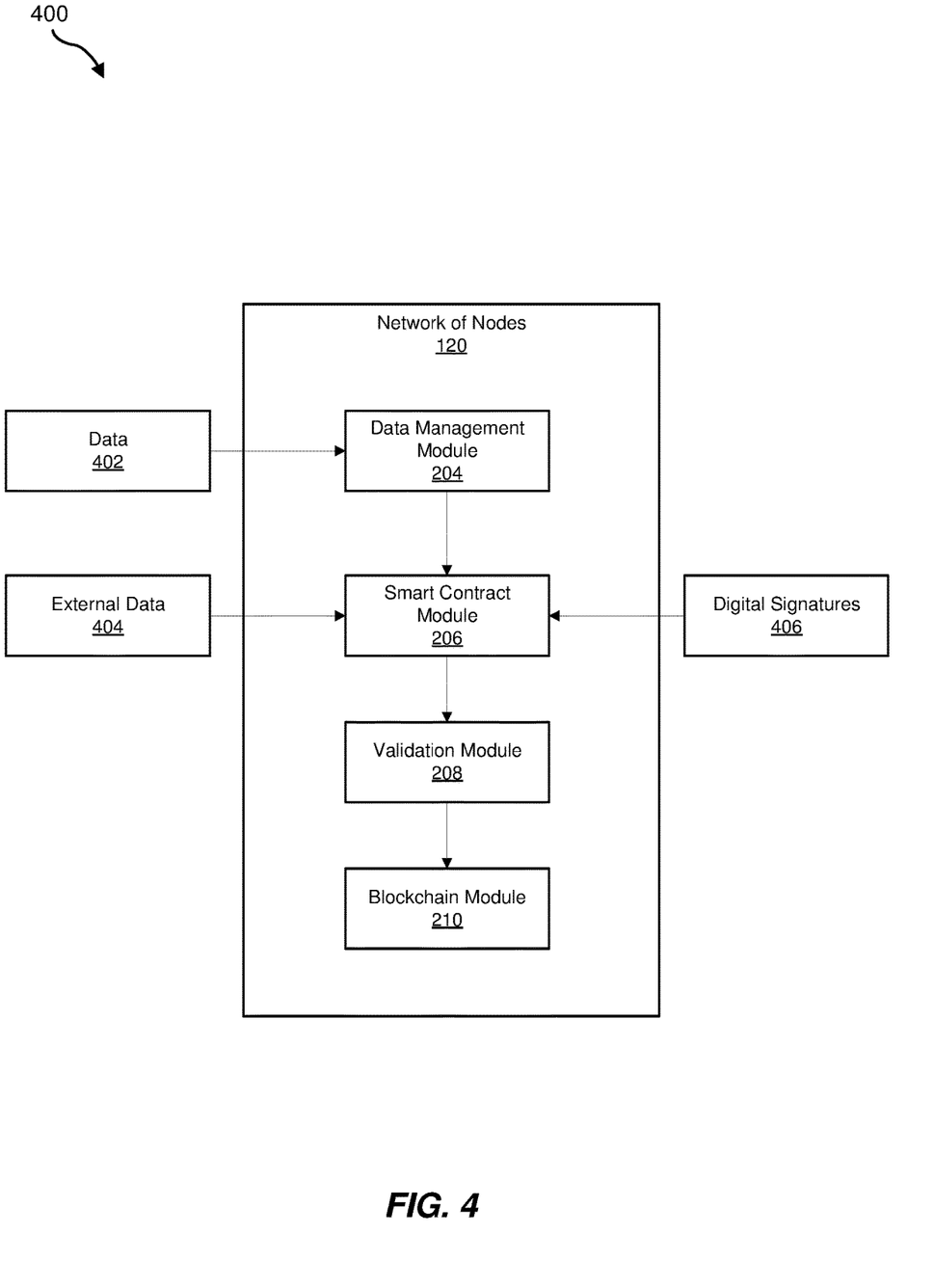
FIG. 4 is a data flow diagram of a method for securing data to the immutable distributed ledger in accordance with one or more embodiments of the disclosure.

The following will provide, with reference to FIG. 1, a high-level overview of systems and methods for logging data to a blockchain. FIGS. 2-3 provide a detailed descriptions of example systems for securing data to blockchains. With reference to FIG. 4, a detailed description of data flow through an example system for securing data to blockchains will be provided. Detailed descriptions of corresponding computer-implemented methods will also be provided in connection with FIGS. 5-8.

FIG. 1 is a block diagram of an exemplary environment 100 for securing data to an immutable distributed ledger in accordance with one or more embodiments of the disclosure. In some examples, a third-party device 110 may build and/or obtain a previously built data set 112. The third-party device 110 may also create a smart contract 114 to include in the immutable distributed ledger 122. The smart contract 114 may specify parties that may have access to the data set 112, terms for how to use the data set 112 (e.g., purposes, length of time, etc.), and other terms to be agreed upon by parties of the smart contract 114.

In some embodiments, the term "data set" may refer to a collection of information. In some examples, the information may be associated with an identified group of people or indicative of characteristics of a target or custom audience. Examples of a data set may include targeting data that may be used for advertisements or otherwise used to identify a group of people with a specific characteristic or trait. Some data sets may include personally identifying information, sensitive information, or the like, which necessitates additional security, such as cryptography as well as obtaining updated attestations based on an identified set of requirements. One example of a data set includes a custom audience data, which may be a collection of information used to target a specific group of individuals with data which may be owned by multiple entities (e.g., third-party, publisher, etc.). For example, the custom audience data set may include characteristics of a group of individuals, contact information (e.g., email, phone numbers, address, user identifiers, etc.), and the like.

In some embodiments, the term "smart contract" may refer to a set of rules stored in a block of a blockchain that includes rules for the terms of an agreement, verifying fulfillment of the terms, and then executing the agreed terms. In some examples, a smart contract of a blockchain may include a rule to check a prior validation of data from uploading the data to the immutable distributed ledger, a rule to communicate with an external data source to check validity of the data, a rule to check a current permission status from individuals associated with the data, or the like. The smart contract 114 may outline rules that indicate a type of user that may access the data set 112, how the data set 112 may be used, a duration of time the data set 112 may be used, and the like.

In some embodiments, the term "digital signatures" may refer to a type of electronic signature that encrypts information or data with a digital code that is difficult to duplicate. In some examples, a digital signature may be used for presenting the authenticity of a digital message or transaction. The digital signature may provide the recipient assurance that the message or transaction is created by a known sender, that the sender cannot deny having sent the message, and that the message was not altered during transmission. In some examples, the digital signature 116 may serve as an attestation associated with the data set 112. In some examples, a separate attestation may be associated with the data set 112 and the digital signature 116 may serve to indicate the intent of the parties to enter the smart contract 114 or be bound to the terms of the smart contract 114. The attestation may be data that indicates that the data set, such as the data set 112, is collected in accordance with a specific set of rules and/or guidelines. The attestation may indicate that the data set 112 was collected using rules and/or guidelines that satisfy or comply with an identified set of legal or ethical rules. Examples of attestations may include a statement identifying the rules and/or guidelines and a signature, such as a digital signature or similar indication that identifies an individual confirming the statement.

In some examples, the third-party device 110 may provide a digital signature 116 as an attestation that the data set 112 was obtained legally and ethically. An attestation may be a digital signature or other indication or statement that the data set 112 was obtained legally and ethically based on an identified set of rules, laws, and/or guidelines. The third-party device 110 may transmit all or a portion of the data set 112, the smart contract 114, and the digital signature 116 to a network of nodes 120 with a request to add the smart contract 114 and the data set 112 to the immutable distributed ledger 122.

The network of nodes 120 may receive the request from third-party device 110. In some embodiments, the term "network of nodes" may refer to one or more computing devices connected to the Internet and is part of a peer-to-peer network of the immutable distributed ledger 122. Each active computing device may be a node of the network of nodes 120. The nodes may be arranged in a tree, such as a Merkle tree. In some embodiments, different nodes may take on different roles to support the immutable distributed ledger 122. For example, a full node may obtain a complete copy of the immutable distributed ledger 122 while a partial or lightweight node may not store the complete immutable distributed ledger 122 and may rely on a full node to obtain transactions that are necessary and relevant to their operation. Nodes may check for incoming transactions using, for example, a consensus protocol, and may confirm and validate transactions, putting them into blocks to add to the immutable distributed ledger 122.

In some embodiments, the term "consensus protocol" may refer to a set of rules that nodes of the network of nodes 120 may utilize to confirm and verify data prior to accepting information to be added to the immutable distributed ledger 122. In some embodiments, to achieve a consensus, a unanimous acceptance between nodes of the network of nodes 120 for identified information may be required.

Examples of consensus protocols may include, but are not limited to, proof of stake protocols and proof of work protocols. A proof of work protocol is a consensus protocol that uses an algorithm that rewards miners (e.g., nodes) who solve mathematical problems (e.g., proof of work problem) with the goal of validating transactions and creating new blocks. The proof of work problem of the proof of work protocol, which may require nodes to complete expensive computer calculations (e.g., mining) to create a new block to add to the immutable distributed ledger 122. Mining provides a mechanism to verify the legitimacy of a transaction and rewarding miners for performing the task. The proof of work problem that must be solved during mining may be difficult to solve and require brute force calculations by the competing nodes but may be easy to check or verify. Nodes of the network of nodes 120 may compete to solve the proof of work problem and the node to successfully solve it and may be rewarded and the block may be added to the immutable distributed ledger 122.

The network of nodes 120 may process the request and may transmit information associated with the data set 112 and the smart contract 114 to a device associated with a publisher 130 for review. The publisher 130 may generate or otherwise use the digital signature 132 to approve the data set 112 and the smart contract 114 and transmit the digital signature 132 to the network of nodes 120.

The network of nodes 120 may validate the information received from the third-party device 110 and the publisher 130 and may execute the smart contract 114 and log the data set 112 and attestations associated with the data set 112 to the immutable distributed ledger 122. The network of nodes 120 may propagate the updates to the immutable distributed FIG. 2 is a block diagram of an example system 200 for securing data to an immutable distributed ledger in accordance with one or more embodiments of the disclosure. The example system 200 is a block diagram of an exemplary node of the network of nodes 120 of FIG. 1, which may secure data to the blockchain. As illustrated in this figure, the example system 200 may include one or more modules 202 for performing one or more tasks. As will be explained in greater detail below, the modules 202 may include a data management module 204 that may receive data from different computing devices and transmit the data to the appropriate module of the system 200, a smart contract module 206 that may receive and process the data associated with smart contracts of the immutable distributed ledger 122, a validation module 208 that may receive the data and validate the data prior to adding the data to the immutable distributed ledger 122, and a blockchain module 210 that may receive the validated data and smart contract from the validation module 208 and process the data to add to the immutable distributed ledger 122. Although illustrated as separate elements, one or more of the modules 202 in FIG. 2 may represent portions of a single module or application.

In certain embodiments, one or more of the modules 202 in FIG. 2 may represent one or more software applications or programs that, when executed by a computing device, may cause the computing device to perform one or more tasks. For example, and as will be described in greater detail below, one or more of the modules 202 may represent the modules stored and configured to run on one or more computing devices, such as the devices illustrated in FIG. 3 (e.g., the computing device 302, the third-party device 304, and/or the publisher device 306). One or more of the modules 202 in FIG. 2 may also represent all or portions of one or more special-purpose computers configured to perform one or more tasks.

As illustrated in FIG. 2, the example system 200 may also include one or more memory devices, such as the memory 240. The memory 240 generally represents any type or form of volatile or non-volatile storage device or medium capable of storing data and/or computer-readable instructions. In one example, the memory 240 may store, load, and/or maintain one or more of the modules 202. Examples of the memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, the example system 200 may also include one or more physical processors, such as the physical processor 230. The physical processor 230 generally represents any type or form of hardware-implemented processing unit capable of interpreting and/or executing computer-readable instructions. In one example, physical processor 230 may access and/or modify one or more of the modules 202 stored in the memory 240. Additionally or alternatively, the physical processor 230 may execute one or more of the modules 202 to facilitate preventing sensitive data sharing. Examples of the physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 2, the example system 200 may also include the data storage 220. The data storage 220 generally represents any type or form of computing device capable of data storage. In one example, the data storage 220 may store the blockchain data 222. The blockchain data 222 may include data logged to the immutable distributed ledger, such as the data set 112, the smart contracts 114, transactions confirmed by the network of nodes 120, and the like.

The example system 200 in FIG. 2 may be implemented in a variety of ways. For example, all or a portion of the example system 200 may represent portions of the example system 300 in FIG. 3. As shown in FIG. 3, the example system 300 may include a computing device 302 in communication with other computing devices (e.g., the third-party device 304 and/or the publisher device 306) via the network 308. In one example, all or a portion of the functionality of the modules 202 may be performed by the computing device 302, the third-party device 304, the publisher device 306 and/or any other suitable computing system. As will be described in greater detail below, one or more of the modules 202 from FIG. 2 may, when executed by at least one processor of the computing device 302, enable the computing device 302, the third-party device 304, and/or the publisher device 306 to secure data to the immutable distributed ledger 122. For example, and as will be described in greater detail below, one or more of the modules 202 may cause the computing device 302 to (i) receive, from the third-party device 110, the smart contract 114 for the publisher 130 and the data set 112, (ii) transmit, to the network of nodes 120, a request to add the smart contract 114 and the data set 112 to the immutable distributed ledger 122, (iii) receive the digital signature 116 from the third-party device 110, (iv) receive the digital signature 132 from the publisher 130, (v) validate the smart contract 114, the digital signature 116 from the third-party device 110, and the digital signature 132 from the publisher 130, and (vi) in response to validating the smart contract, the digital signature from the third-party and the digital signature from the designated party, add the smart contract 114 and the data set 112 to the immutable distributed ledger 122.

The computing device 302, the third-party device 304, and/or the publisher device 306 may generally represent any type or form of computing device capable of reading computer-executable instructions. For example, the computing device 302, the third-party device 304, and/or the publisher device 306 may include an endpoint device (e.g., a mobile computing device) running client-side security software. Additional examples of the computing device 302, the third-party device 304, and/or the publisher device 306 may include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device. Although illustrated as single entities in FIG. 3, the computing device 302, the third-party device 304, and/or the publisher device 306 may include and/or represent a plurality of devices that work and/or operate in conjunction with one another.

The network 308 generally represents any medium or architecture capable of facilitating communication or data transfer. In one example, the network 308 may facilitate communication between the computing device 302, the third-party device 304, and/or the publisher device 306. In this example, the network 308 may facilitate communication or data transfer using wireless and/or wired connections. Examples of the network 308 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

The example system 200 in FIG. 2 may be implemented in a variety of ways. For example, all or a portion of the example system 200 may represent portions of the system 400 in FIG. 4. As will be described in greater detail below, one or more of the modules 202 from FIG. 2 may, when executed by at least one processor of system 200, enable the system 200 to secure the data sets to the immutable distributed ledger 122. For example, and with reference to FIG. 4 and as will be described in greater detail below, one or more of the modules 202 may cause the example system 400 to (i) receive, by the data management module 204, the data 402 (which may include the smart contract 114 for the designated party and the data set 112), (ii) transmit, by the smart contract module 206 and to the network of nodes 120, a request to add the smart contract 114 and the data set 112 to the immutable distributed ledger 122, (iii) receive, by the smart contract module 206, digital signatures 406 (e.g., the digital signature 116 from the third-party device 110, the digital signature 132 from the designated party (e.g., publisher 130), and/or the digital signature from an attester), (iv) validate, by the validation module 208, the smart contract 114 and the digital signatures 406 (e.g., using external data 404 from external data sources), and (v) in response to validating the smart contract 114 and the digital signatures 406, adding, by the blockchain module 210, the smart contract 114 and the data set 112 to the immutable distributed ledger 122.

Figure 5:
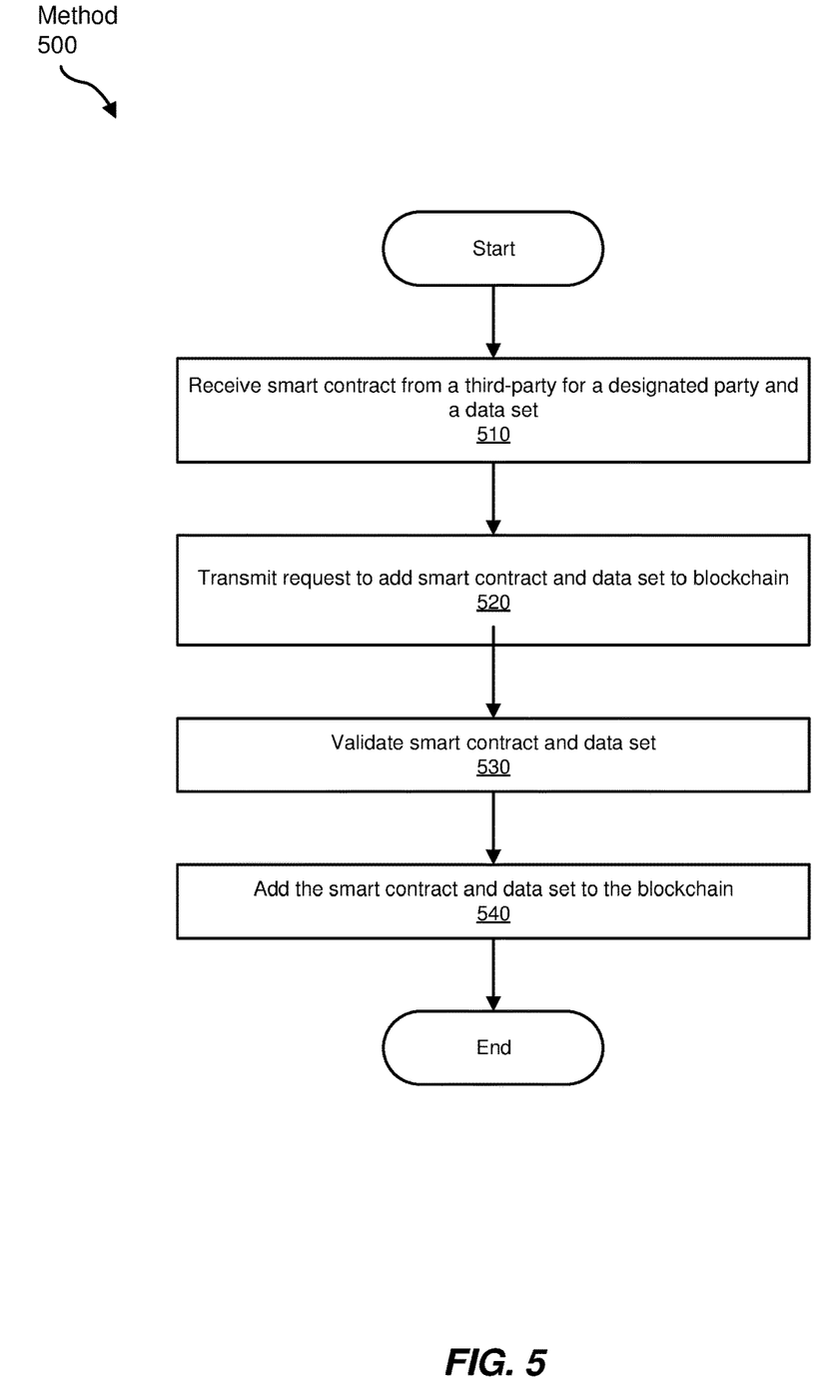
FIG. 5 is a flow diagram of a method for securing data to the immutable distributed ledger in accordance with one or more embodiments of the disclosure.

FIG. 5 is a flow diagram of an exemplary computer-implemented method 500 for logging and securing data to the immutable distributed ledger in accordance with one or more embodiments of the disclosure. The steps shown in FIG. 5 may be performed by any suitable computer-executable code and/or computing system, including the system(s) illustrated in FIG. 2 and FIG. 3. In one example, each of the steps shown in FIG. 5 may represent an algorithm whose structure includes and/or is represented by multiple sub-steps, examples of which will be provided in greater detail below.

As illustrated in FIG. 5, at step 510 one or more of the systems described herein may receive the smart contract 114 for the designated party, such as publisher 130, and the data set 112. They system may receive the smart contract 114 in any suitable manner. In some examples, a node of the network of nodes 120 may receive the smart contract 114 and the data set 112 to store in a block of the immutable distributed ledger 122. The smart contract 114 may be received from a third-party, such as the third-party device 110. The smart contract 114 may be included in a request from the third-party via a secured or encrypted network connection from one or more devices associated with the third-party. The request from the third-party may include instructions to add the smart contract 114 or the data set 112 to the immutable distributed ledger 122. For example, the data management module 204 may, as part of the computing device 302 in FIG. 3, receive the smart contract 114 and the data set 112 from a third-party, such as third-party device 110. In some embodiments, the data management module 204 may process the smart contract 114 and the data set 112 received. For example, the data management module 204 may extract the smart contract 114 and/or the data set 112 from the request. The system may process the smart contract 114 and the data set 112 in any suitable manner. For example, the data management module 204 may obtain the smart contract 114 from the request. The data management module 204 may process the smart contract 114 and parse the terms of the smart contract 114 for further processing. The data set 112 may be stripped of any formatting and/or may be converted to a format used by the system. For example, any text formatting or hyperlinks may be removed and the data set 112 may be converted to plain text. In some examples, the data set 112 may be processed to remove any unnecessary metadata or remove any specific formatting applied to the data set 112. The data set 112 may be processed and parsed.

At step 520, one or more of the systems described herein may transmit a request to the network of nodes 120 to add the smart contract 114 and the data set 112 to the immutable distributed ledger 122. The smart contract module 206 may generate a request or a transaction record to the other nodes in the network of nodes 120 to add the smart contract 114 and the data set 112 to the immutable distributed ledger 122. The system may transmit the request to the network of nodes 120 in any suitable manner. In some examples, the request to add the smart contract 114 to the immutable distributed ledger 122 may be added to a queue or pool of the network of nodes 120 for unconfirmed transactions or requests. For example, the data management module 204 may communicate with the validation module 208 to generate the request to add the smart contract 114 and/or log the data set 112 to the immutable distributed ledger 122. The validation module 208 may transmit the request to other nodes in the network of nodes 120. The validation module 208 may add the request to the queue or pool of unconfirmed transactions for the immutable distributed ledger 122 of the network of nodes 120.

At step 530, one or more of the systems described herein may validate the request to add the smart contract 114 and the data set 112. The smart contract module 206 may process the rules and terms of the smart contract 114 to confirm and validate the smart contract 114 and communicate with the validation module 208 to validate the data set 112 and/or digital signatures associated with the smart contract 114 (e.g., the digital signature 116 from the third-party device 110 and/or the digital signature 132 from the publisher 130). In some embodiments, the validation module 208 may check the digital signatures associated with individuals or entities from which the data set 112 was collected to ensure that permission to use the information in the data set 112 is current. In other examples, the validation module 208 may execute one or more consensus protocols for the smart contract 114 and the data set 112. As part of the validation process, the validation module 208 may implement a consensus protocol to validate the received smart contract 114 and/or the data set 112 to add them to the immutable distributed ledger 122. The consensus protocol may be a set of rules that nodes of the network of nodes 120 may utilize to confirm and verify data prior to accepting information to be added to the immutable distributed ledger 122. In some embodiments, to achieve a consensus, a unanimous acceptance between nodes of the network of nodes 120 may be necessary for the identified information. In some embodiments, the validation module 208 may communicate with external sources to obtain additional information to use to validate the information. Examples of consensus protocols may include, but are not limited to, proof of stake protocols and proof of work protocols.

The systems may validate the request to add the smart contract 114 to the immutable distributed ledger 122. The system may validate the request to add the smart contract 114 in any suitable manner. The system may execute one or more consensus protocols to validate and confirm the request to add the smart contract 114 to the immutable distributed ledger 122. For example, the validation module 208 may execute one or more consensus protocols. As part of the validation process, the validation module 208 may implement the consensus protocol to validate the request to add the smart contract 114 and to accept the smart contract 114 and the data set 112 to the immutable distributed ledger 122. A consensus protocol may be a set of rules that nodes of the network of nodes 120 may utilize to confirm and verify transactions prior to accepting information to be added to the immutable distributed ledger 122. In some embodiments, to achieve a consensus, a unanimous acceptance between nodes of the network of nodes 120 for identified information may be required Examples of consensus protocols may include, but are not limited to, proof of stake protocols or proof of work protocols. A proof of work protocol is a consensus protocol that uses an algorithm that rewards miners (e.g., nodes) who solve mathematical problems (e.g., proof of work problem) with the goal of validating transactions and creating new blocks. The proof of work protocol may require nodes to complete expensive computer calculations (e.g., mining) to create a new block to add to a blockchain. Mining provides a mechanism to verify the legitimacy of a transaction and rewarding miners for performing the task. The proof of work problem that must be solved during mining may be difficult to solve and require brute force calculations by the competing nodes but may be easy to check or verify. Nodes of the network of nodes 120 may compete to solve the proof of work problem and the node to successfully solve it and may be rewarded and the block may be added to the blockchain. Mining also supports a decentralized system and avoiding a central data repository. For example, a decentralized network provided by mining may require a malicious actor to command over half of the total computation a power of the network to violate the protocol.

To validate the request to add the smart contract 114 to the immutable distributed ledger 122, one or more nodes of the network of nodes 120 may select a transaction (e.g., the request to add the smart contract 114 to the immutable distributed ledger 122) from the queue or pool of transactions associated with the immutable distributed ledger. The network of nodes 120 of the immutable distributed ledger 122 may implement a proof of work consensus protocol. For example, the validation module 208 of each of the nodes that selected the request to add the smart contract 114 from the queue or pool may generate a new block that includes the smart contract 114, the data set 112, and a proof of work problem. Although each node may have selected the same transaction (e.g., request to add the smart contract 114) from the pool, each of the nodes may have a different proof of work problem. The respective proof of work problems of the different nodes may be different but will be of the same difficulty. The node that successfully answers their respective proof of work problem may add the smart contract 114 to the immutable distributed ledger 122 upon verification that the answer computed by the node is correct. The node that computes the correct solution to their respective proof of work problem may transmit the solution (e.g., "proof of work"), to the other nodes that are mining (e.g., computing solutions to their respective proof of work problems). When the other nodes receive the answer from the node that computed the correct answer, the other nodes may verify whether the work of the node that computed the correct solution has resulted in the correct solution. Once the other nodes determine that the transmitting node has the correct solution, then the network of nodes 120 may reach a consensus. Upon reaching the consensus, the node may complete the transactions (e.g., add the smart contract 114 to the immutable distributed ledger 122). The node that added the smart contract 114 may receive a reward, such as an increase in reputation score, a sum of money, or the like.

The system may utilize a different type of consensus protocol. For example, a proof of stake protocol is a different way to validate transactions for the immutable distributed ledger. The node of the network of nodes 120 that creates a new block may be chosen in a deterministic way depending on its stake (e.g., number of coins or currency held by the node or miner) or age of the node. Thus, a miner is limited to mining a percentage of transactions that is reflective of their ownership stake. For example, a miner who owns 10% of currency available in the system may only mine 10% of the blocks. The nodes, rather than competing for a block reward, take a transaction fee.

To validate the request to add the smart contract 114 to the immutable distributed ledger 122 using a proof of stake consensus protocol, a node of the network of nodes 120 may be selected to complete the transaction (e.g., the request to add the smart contract 114 to the immutable distributed ledger 122). The node may be selected from the network of nodes 120 using a deterministic method, such as selecting the node with the highest associated reputation score, the highest amount of associated wealth (e.g., amount of money associated with the node), the oldest node, or the like. In some examples, the reputation score may indicate the number of successful transactions completed by the node, where each successful transaction increases the reputation score. The node may receive the request to add the smart contract 114 to the immutable distributed ledger 122. Upon successfully adding the smart contract 114 to the immutable distributed ledger 122, the validation module 208 may update the reputation score of the node, resulting in a higher reputation score. Similar steps may be used to increase the wealth associated with a node (e.g., receive a transaction fee) if the network of nodes 120 utilizes wealth instead of reputation scores.

In some examples, the data set 112 may be validated prior to being logged to the immutable distributed ledger 122. In some examples the data set 112 may be validated in any suitable manner. For example, the data set 112 may be validated to ensure that the data set 112 is correctly formatted or organized in accordance to the requirements of the immutable distributed ledger 122. In some examples, the data set 112 may be validated to ensure that the data set 112 was collected in accordance to an identified set of rules, guidelines, and/or laws. For example, the validation module 208 may check digital signatures associated with individuals or entities from which the data set 112 was collected to ensure that the individuals or entities granted permission to use the data and/or to verify that the authorization to use the data set 112 is current. In some embodiments, the validation module 208 may communicate with external sources to obtain additional information (e.g., external data 404) used to validate information. For example, the validation module 208 may communicate with the external sources to obtain the digital signatures associated with the data set 112 collected. The digital signatures of the individuals or entities from whom the data set 112 was collected may be stored and maintained by the external sources and accessed by the validation module 208 during the validation of the data set 112 prior to logging the data to the immutable distributed ledger 122.

Upon validation of the request to add the smart contract 114 to the immutable distributed ledger 122, the smart contract 114 and the data set 112 may be added to the immutable distributed ledger 122 by the smart contract module 206.

At step 540, in response to the validation of the request to add the smart contract 114 and the data set 112 by the nodes in the network of nodes 120 using the consensus protocol, the smart contract 114 and the data set 112 may be added to the immutable distributed ledger 122. In some examples, the blockchain module 210 may generate a new record or block. The blockchain module 210 may execute the smart contract 114 and log the data set 112 to the block. The data set 112 may be processed, for example, to encrypt the data using public keys from entities authorized to access the data set 112. The new record may include a timestamp, a third-party identifier, one or more attestations associated with the data set 112, and/or the data set 112. The third-party identifier may be a unique identifier associated with the third-party or a third-party computing device. Examples of a third-party identifier may include an email address, a unique username that includes a combination of letters, numbers, and/or symbols, a randomly generated string or number assigned to the third-party, or the like. The new record or block may be added to the immutable distributed ledger 122. In some examples, the new record or block may be added to the immutable distributed ledger 122 by adding a hash of a prior block of the immutable distributed ledger 122 to the new record or block.

Figure 6:
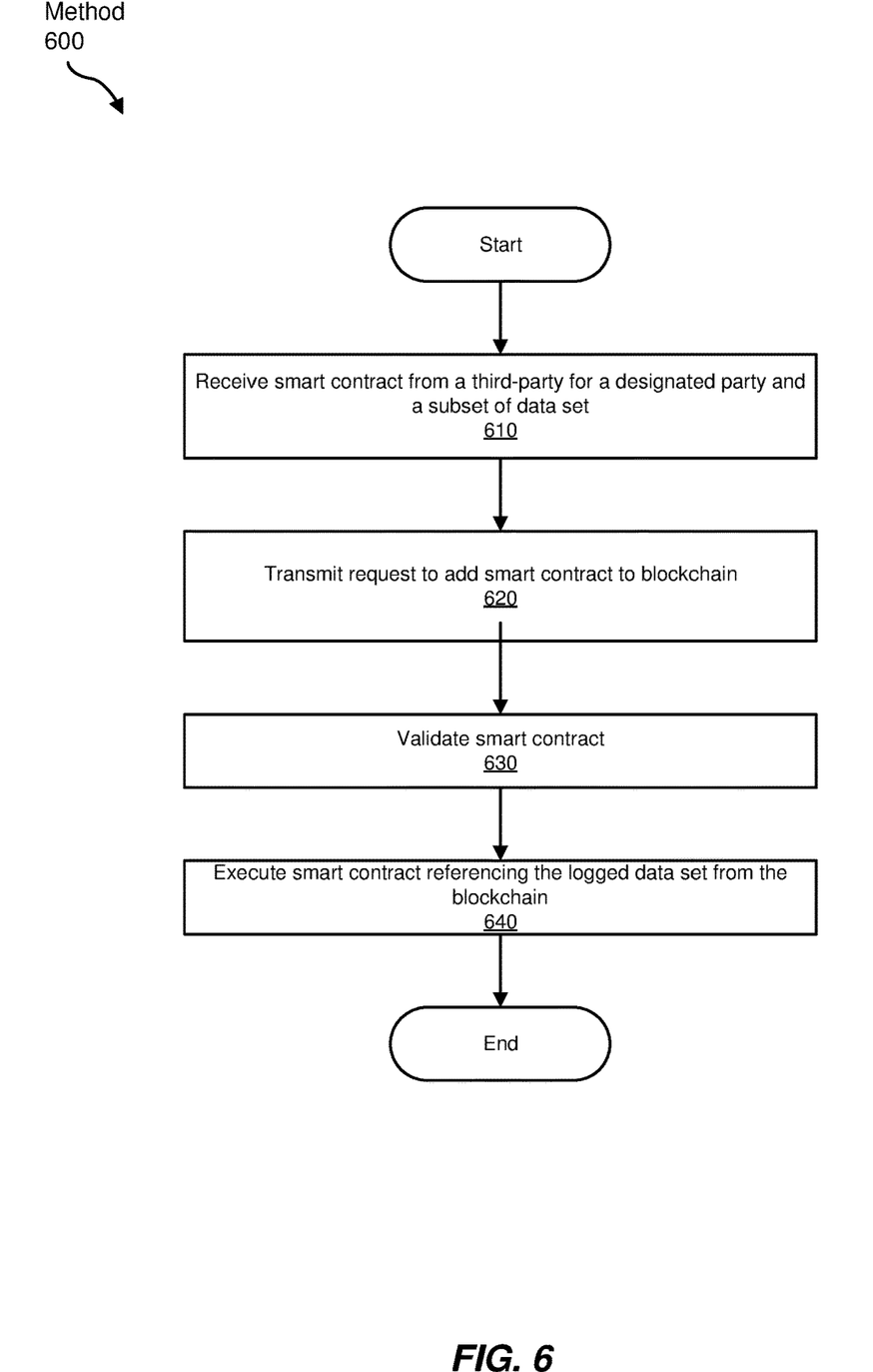
FIG. 6 is a flow diagram of a method for retrieving data from the immutable distributed ledger in accordance with one or more embodiments of the disclosure.

FIG. 6 is a flow diagram of a method 600 for retrieving data from the immutable distributed ledger in accordance with one or more embodiments of the disclosure. The steps shown in FIG. 6 may be performed by any suitable computer-executable code and/or computing system, including the system(s) illustrated in FIG. 2 and FIG. 3. In one example, each of the steps shown in FIG. 6 may represent an algorithm whose structure includes and/or is represented by multiple sub-steps, examples of which will be provided in greater detail below.

At step 610, one or more of the systems described herein may receive the smart contract 114 from the third-party (e.g., third-party device 110) for the designated party (e.g., publisher 130) and the data set 112 stored in the immutable distributed ledger 122. In some examples, the smart contract 114 may refer to the data set 112 that was previously uploaded to the immutable distributed ledger 122. The data system may receive the smart contract 114 from the third-party device 110 and may process the smart contract 114. In some examples, the smart contract 114 and the data set 112 may be processed as described in relation to FIG. 5, described herein.

At step 620, one or more systems described herein may transmit a request to add the smart contract 114 referencing the logged data set 112 to the immutable distributed ledger 122. In some embodiments, the system may transmit the request to add the smart contract 114 in any suitable manner. For example, the system may generate a request to add the smart contract 114 to the immutable distributed ledger 122. In some examples, the request to add the smart contract 114 to the immutable distributed ledger 122 may be added to a queue or pool of the network of nodes 120 for unconfirmed transactions or requests. For example, the data management module 204 may communicate with the validation module 208 to generate the request to add the smart contract 114 to the immutable distributed ledger 122. The validation module 208 may transmit the request to other nodes in the network of nodes 120. The validation module 208 may add the request to the queue or pool of unconfirmed transactions for the immutable distributed ledger 122 of the network of nodes 120. The system may validate the request to add the smart contract 114 to the immutable distributed ledger 122, as described in relation to FIG. 5, described herein. At step 630, the systems and methods described herein may validate the smart contract 114. The system may validate the smart contract 114 and/or the data set 112 in any suitable manner. For example, the system may process the rules and terms of the smart contract 114 to confirm and validate the smart contract 114 and confirm that the data set 112 and/or the digital signatures associated with the smart contract 114 (e.g., digital signature 116 from the third-party device 110 and/or the digital signature 132 from the publisher 130) are valid. In some examples, the system may check digital signatures associated with individuals or entities from which the data set 112 was collected to ensure that permission to use the data is current. In other examples, the system may execute one or more consensus protocols for the smart contract 114 and the data set 112. In some embodiments, the system may communicate with external sources to obtain additional information to use to validate the information. At step 640, one or more of the systems described herein may execute the validated smart contract 114 referencing the logged data set 112 from the immutable distributed ledger 122 and add the smart contract 114 to the immutable distributed ledger 122.

Figure 7:
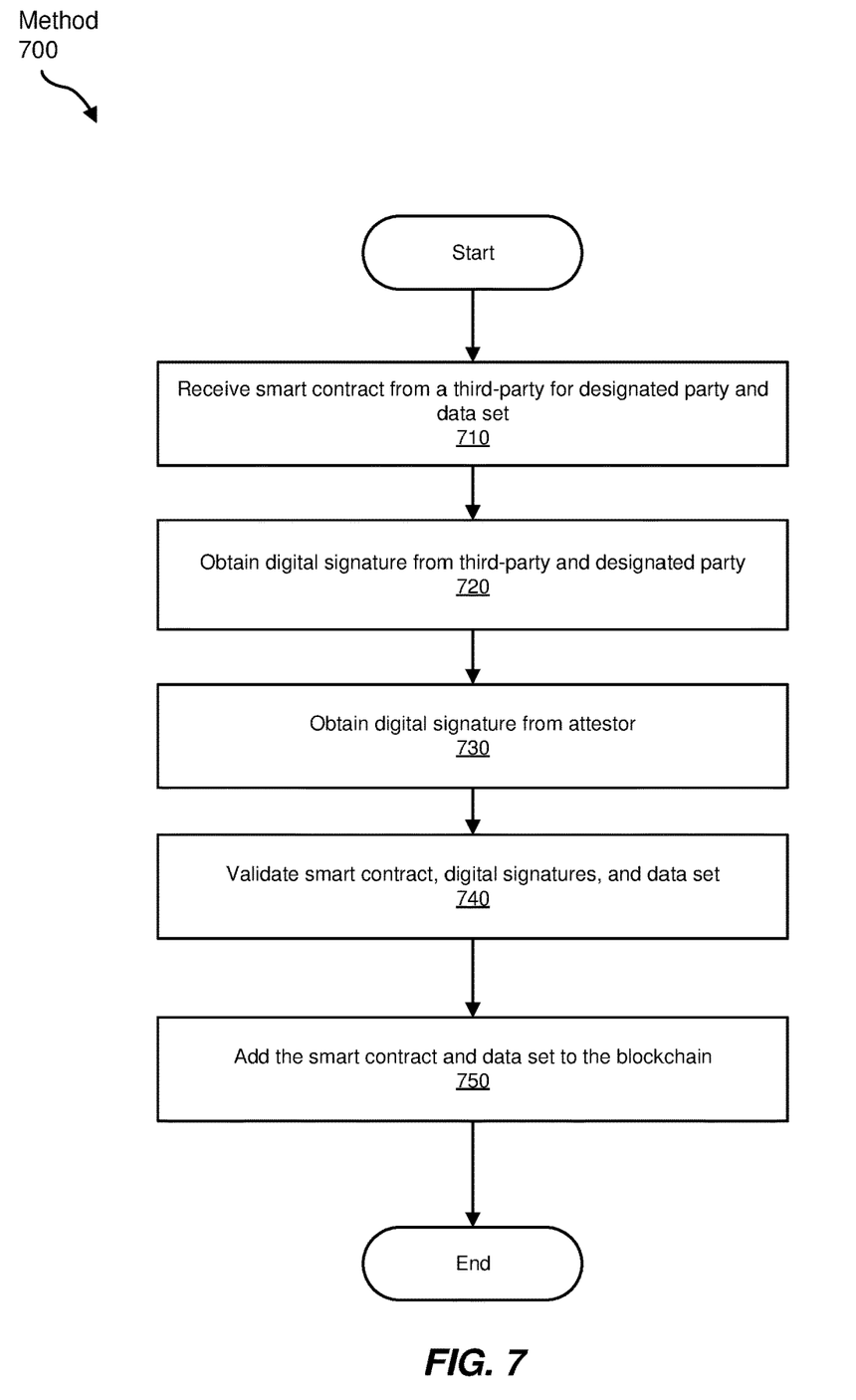
FIG. 7 is a flow diagram of a method for securing data to the immutable distributed ledger with an additional party in accordance with one or more embodiments of the disclosure.

FIG. 7 is a flow diagram of a method 700 for securing data to the immutable distributed ledger with an additional party in accordance with one or more embodiments of the disclosure. The steps shown in FIG. 7 may be performed by any suitable computer-executable code and/or computing system, including the system(s) illustrated in FIG. 2 and FIG. 3. In one example, each of the steps shown in FIG. 7 may represent an algorithm whose structure includes and/or is represented by multiple sub-steps, examples of which will be provided in greater detail below.

At step 710, one or more of the systems described herein may receive the smart contract 114 from the third-party (e.g., third-party device 110) for the designated party (e.g., publisher 130) and the data set 112. The system may receive the smart contract 114 in any suitable manner. For example, the system may receive the smart contract 114 and the data set 112 over a secured connection and/or using secured protocols. The system may receive and process the smart contract 114 and the data set 112.

At step 720, the smart contract module 206 may obtain digital signatures 406 from the third-party (e.g., third-party device 110) and the designated party (e.g., publisher 130). The system may obtain the digital signatures 406 in any suitable manner. In some examples, the third-party device 110 may transmit the digital signature with the smart contract 114 and the data set 112. In some examples, the third-party device 110 may transmit the digital signature 116 in a separate communication than the smart contract 114. The digital signature 116 may indicate the intent of the third-party to enter the smart contract 114 or be bound to the terms of the smart contract 114. The digital signature 116 may also serve as the attestation for the data set 112, which indicates that the smart contract 114 and the data set 112 conform to an identified set of guidelines, laws, or rules, and are ethical and legal in accordance with such. In another example, a separate attestation (e.g., a separate digital signature or indication) may be associated with the data set 112.

The system may transmit the smart contract 114 and information about the data set 112 to the designated party (e.g., publisher 130). The designated party may review the information and may generate or otherwise use and transmit the digital signature 132 to the computing device 302. The digital signature 132 may indicate that the publisher attests that the terms of the smart contract 114 and the data set 112 are ethical and legal and in accordance with an identified set of guidelines, laws, or rules. The digital signature 132 may also indicate the intent of the publisher 130 to enter the smart contract 114 or be bound by the terms of the smart contract 114.

At step 730, the smart contract module 206 may obtain a digital signature from an attester. In some examples, the smart contract 114 may specify that an attester is required. An attester may be a regulator or an entity different than the third-party and the publisher 130 to ensure that an objective party is witness to the terms of the smart contract 114. The smart contract 114 may specify a specific individual or entity as an attester or may obtain an attester that meets a predetermined set of requirements. The smart contract module 206 may obtain the digital signature of the attester, which may be used in the validation of the smart contract 114.

At step 740, the systems and methods described herein may validate the smart contract 114, digital signatures (e.g., the third-party digital signature 116, the publisher digital signature 132, and/or the attester digital signature). The smart contract module 206 may process the rules and terms of the smart contract 114 to confirm and validate the smart contract 114 and communicate with the validation module 208 to confirm and validate the logged data set 112 and/or digital signatures 406 associated with the smart contract 114 (e.g., the third-party digital signature 116, the publisher digital signature 132, and/or the attester digital signature). In some embodiments, the validation module 208 may check digital signatures associated with individuals or entities from which the data set 112 was collected to ensure that permission to use the data is current. In other examples, validation module 208 may execute one or more consensus protocols for the smart contract 114 and the data set 112.

At step 750, one or more of the systems described herein may execute the validated smart contract 114 and log the data set 112 to the immutable distributed ledger 122.

Figure 8:
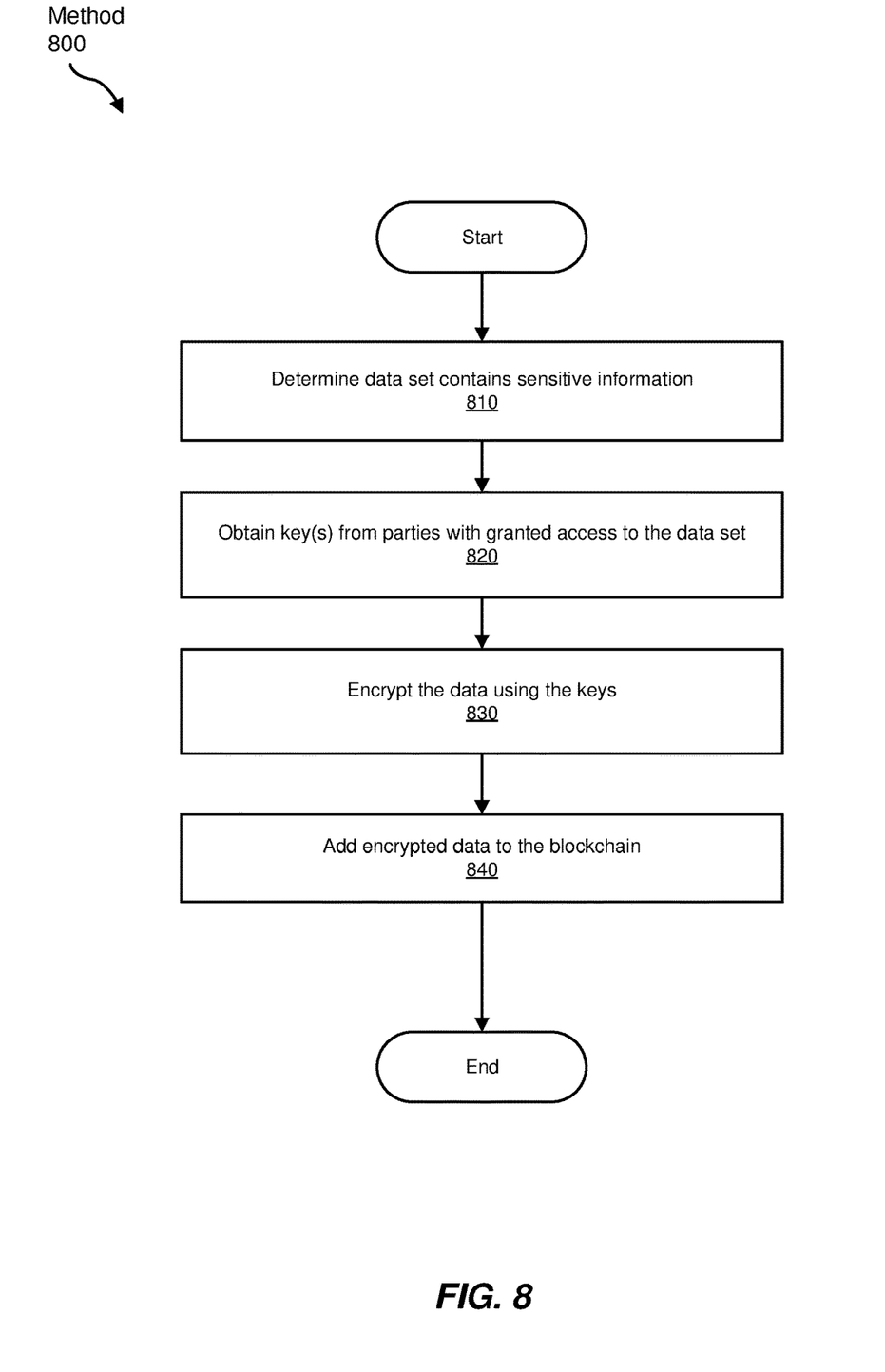
FIG. 8 is a flow diagram of a method for encrypting data to be logged to an immutable distributed ledger in accordance with one or more embodiments of the disclosure.

FIG. 8 is a flow diagram of a method 800 for encrypting data to be logged to an immutable distributed ledger in accordance with one or more embodiments of the disclosure. The steps shown in FIG. 8 may be performed by any suitable computer-executable code and/or computing system, including the system(s) illustrated in FIG. 2 and FIG. 3. In one example, each of the steps shown in FIG. 8 may represent an algorithm whose structure includes and/or is represented by multiple sub-steps, examples of which will be provided in greater detail below.

At step 810, one or more systems described herein may determine whether the data set 112 contains any sensitive information. The system may determine whether the data set 112 contains sensitive information in any suitable manner. For example, the system may process the data set 112 to identify any personally identifying information or any information tagged by an entity of the smart contract 114 as private, sensitive, secret, or the like. Examples of sensitive information may include names, contact information, user identifiers and passwords, internal project names, and the like. The system may compare strings from a list of words that have been categorized as sensitive to the data set 112. In some examples, the list of words or phrases may be generated based on machine learning algorithms or from receiving indications of categorized words from one or more users. In some examples, the system may identify a pattern (e.g., address, email address, etc.) in the data set 112 and may categorize the data set 112 as containing sensitive information.

At step 820, one or more of the systems described herein may obtain keys and/or tokens (e.g., public keys, etc.) from parties granted access to the data set 112. The system may obtain keys and/or tokens from parties to be granted access to the data set 112 in any suitable manner. For example, the keys may be obtained directly from the entities or from a secure location designated by the entities. In some examples, the system may obtain the keys from the entities authorized to access the data set 112 to be stored in the blockchain. In some examples, the system may generate key pairs for each of the parties authorized to access the data set 112 and may transmit a respective key of the generated key pairs to the respective parties.

At step 830, one or more systems described herein may encrypt the data set 112 using the obtained keys. The system may encrypt the data set 112 using the obtained keys in any suitable manner. In some examples, the system may encrypt the data set 112 using one or more known methods of cryptography and/or encryption to ensure the sensitive data is securely stored in the immutable distributed ledger 122.

At step 840, one or more systems described herein may add the encrypted data set 112 to the immutable distributed ledger 122. The system may add the encrypted data set 112 to the immutable distributed ledger 122 in any suitable manner. In some examples, the system may generate a new block, add the encrypted data set 112 and execute the smart contract 114 associated with the encrypted data set 112 to the immutable distributed ledger 122.

The systems and methods described herein are directed to logging data to an immutable distributed ledger or a blockchain. Creating an immutable record of transactions that occur with specific data sets may provide a computationally verifiable mechanism to prove the provenance of data being used. Generating a verifiable digital trail to reflect the storage, validation, and access of data sets may protect against the data being improperly managed or used or otherwise distributed without the appropriate permissions.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, by a computing device, a smart contract from a third-party for a designated party and a data set that includes data collected by the designated party from at least one targeted entity, wherein the smart contract includes a rule to check a permission status from the at least one targeted entity to use the collected data;
   transmitting, to a network of nodes, a request to add the smart contract and the data set to an immutable distributed ledger;
   receiving a digital signature from the third-party;
   receiving a digital signature from the designated party;
   validating the smart contract, the digital signature from the third-party, and the digital signature from the designated party, wherein validating the smart contract includes processing the rule; and
   in response to validating the smart contract, the digital signature from the third-party and the digital signature from the designated party, adding the smart contract and the data set to the immutable distributed ledger.

2. The computer-implemented method of claim 1, wherein the digital signature from the third-party is an attestation that the data set is legal and ethical and wherein the digital signature from the designated party is an attestation that the data set is legal and ethical.

3. The computer-implemented method of claim 1, wherein the data set comprises personally identifying information and the method further comprises:
   obtaining a public key of the third-party;
   obtaining a public key of the designated party; and
   encrypting the data set with the public key of the third-party and the public key of the designated party.

4. The computer-implemented method of claim 3, further comprising:
   obtaining a public key of a party granted access to the data set; and
   encrypting the data set with the public key of the party granted access to the data set.

5. The computer-implemented method of claim 1, wherein the smart contract comprises a hash of external data used to build the data set.

6. The computer-implemented method of claim 1, further comprising:
   receiving a digital signature from a regulator as an attester of the smart contract; and
   validating the smart contract, the digital signature from the third-party, the digital signature from the designated party, and the digital signature from the regulator.

7. The computer-implemented method of claim 1, wherein validating the smart contract further comprises:
   obtaining information from an external data source; and
   verifying the data set using the information from the external data source.

8. The computer-implemented method of claim 1, wherein adding the smart contract and the data set to the immutable distributed ledger further comprises executing the smart contract and logging the data set to the immutable distributed ledger.

9. The computer-implemented method of claim 1, wherein adding the smart contract and the data set comprises:
   obtaining a prior record in the immutable distributed ledger;
   generating a hash of the prior record;
   generating a new record comprising the hash of the prior record and the data set; and
   adding the new record to the immutable distributed ledger.

10. The computer-implemented method of claim 1, further comprising:
    receiving a second smart contract from the third-party for a second designated party and a subset of the data set;
    transmitting, to the network of nodes, a second request to add the second smart contract and the subset of the data set to the immutable distributed ledger;
    receiving a new digital signature from the third-party;
    receiving a digital signature from the second designated party;
    validating the second smart contract, the new digital signature from the third-party, and the digital signature from the second designated party; and
    adding the second smart contract and the subset of the data set to the immutable distributed ledger.

11. A system comprising:
    a computing device comprising at least one physical processor; and
    physical memory comprising computer-executable instructions that, when executed by the at least one physical processor, cause the computing device to:
      receive a smart contract from a third-party for a designated party and a data set that includes data collected by the designated party from at least one targeted entity, wherein the smart contract includes a rule to check a permission status from the at least one targeted entity to use the collected data;
      transmit, to a network of nodes, a request to add the smart contract and the data set to an immutable distributed ledger;
      receive a digital signature from the third-party;
      receive a digital signature from the designated party;
      validate the smart contract, the digital signature from the third-party, and the digital signature from the designated party, wherein validating the smart contract includes processing the rule; and
      in response to validating the smart contract, the digital signature from the third-party and the digital signature from the designated party, add the smart contract and the data set to the immutable distributed ledger.

12. The system of claim 11, wherein the digital signature from the third-party is an attestation that the data set is legal and ethical and wherein the digital signature from the designated party is an attestation that the data set is legal and ethical.

13. The system of claim 11, wherein the data set comprises personally identifying information and wherein the computer-executable instructions further cause the computing device to:
    obtain a public key of the third-party;
    obtain a public key of the designated party; and
    encrypt the data set with the public key of the third-party and the public key of the designated party.

14. The system of claim 13, wherein the computer-executable instructions further cause the computing device to:
    obtain a public key of a party granted access to the data set; and
    encrypt the data set with the public key of the party granted access to the data set.

15. The system of claim 11, wherein the smart contract comprises a hash of external data used to build the data set.

16. The system of claim 11, wherein the computer-executable instructions further cause the computing device to:
    receive a digital signature from a regulator as an attester of the smart contract; and
    validate the smart contract, the digital signature from the third-party, the digital signature from the designated party, and the digital signature from the regulator.

17. The system of claim 11, wherein, to validate the smart contract, the computer-executable instructions further cause the computing device to:
    obtain information from an external data source; and
    verify the data set using the information from the external data source.

18. The system of claim 11, wherein, to add the smart contract and the data set to the immutable distributed ledger, the computer-executable instructions further cause the computing device to:
    execute the smart contract and logging the data set to the immutable distributed ledger.

19. The system of claim 11, wherein the computer-executable instructions further cause the computing device to:
    receive a second smart contract from the third-party for a second designated party and a subset of the data set;
    transmit, to the network of nodes, a second request to add the second smart contract and the subset of the data set to the immutable distributed ledger;
    receive a new digital signature from the third-party;

receive a digital signature from the second designated party;

validate the second smart contract, the new digital signature from the third-party, and the digital signature from the second designated party; and add the second smart contract and the subset of the data set to the immutable distributed ledger.

20. A computer-readable medium comprising:

computer-readable instructions that, when executed by at least one processor of a computing device, cause the computing device to:

receive a smart contract from a third-party for a designated party and a data set that includes data collected by the designated party from at least one targeted entity, wherein the smart contract includes a rule to check a permission status from the at least one targeted entity to use the collected data;

transmit, to a network of nodes, a request to add the smart contract and the data set to an immutable distributed ledger;

receive a digital signature from the third-party;

receive a digital signature from the designated party;

validate the smart contract, the digital signature from the third-party, and the digital signature from the designated party, wherein validating the smart contract includes processing the rule; and in response to validating the smart contract, the digital signature from the third-party and the digital signature from the designated party, add the smart contract and the data set to the immutable distributed ledger.

* * * * *